Sept. 17, 1957  P. VAN DIJK  2,806,501
PROCESS FOR SEPARATING KERNELS FROM HARD-SHELLED NUTS
Filed Nov. 17, 1953  4 Sheets-Sheet 1
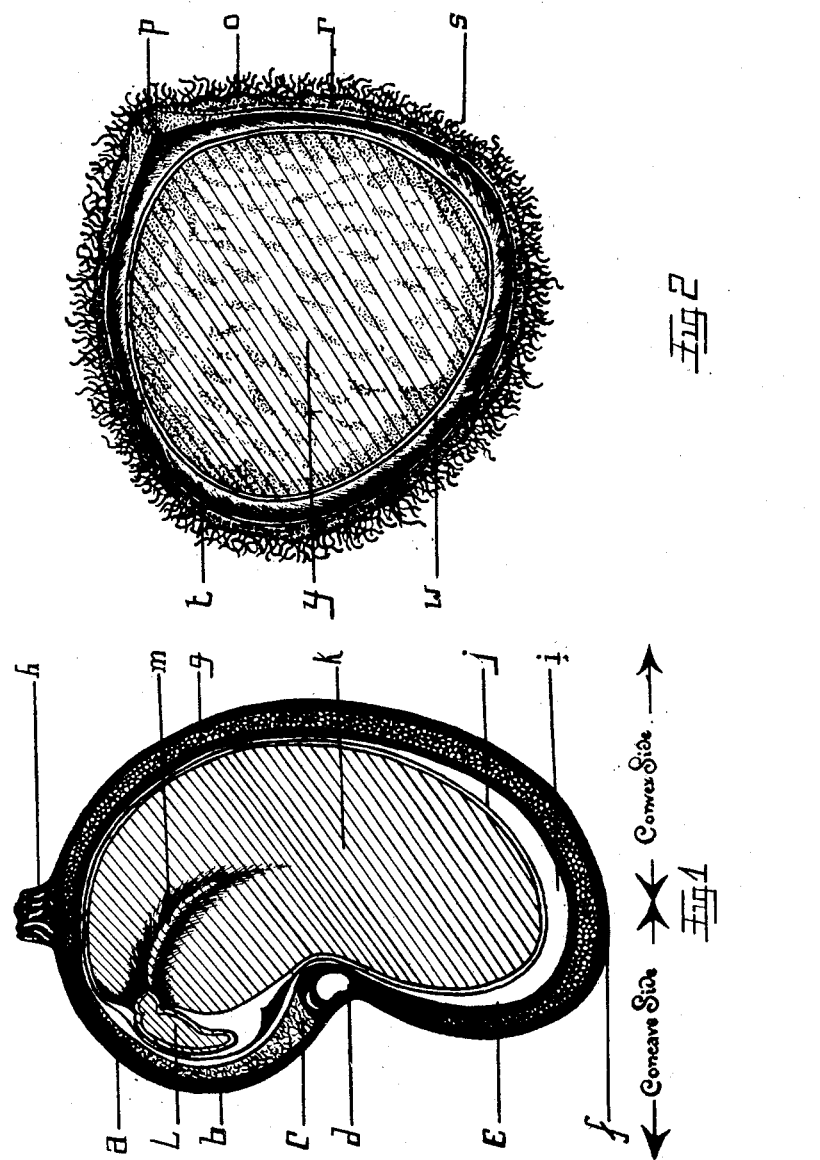
Inventor
PIETER VAN DIJK

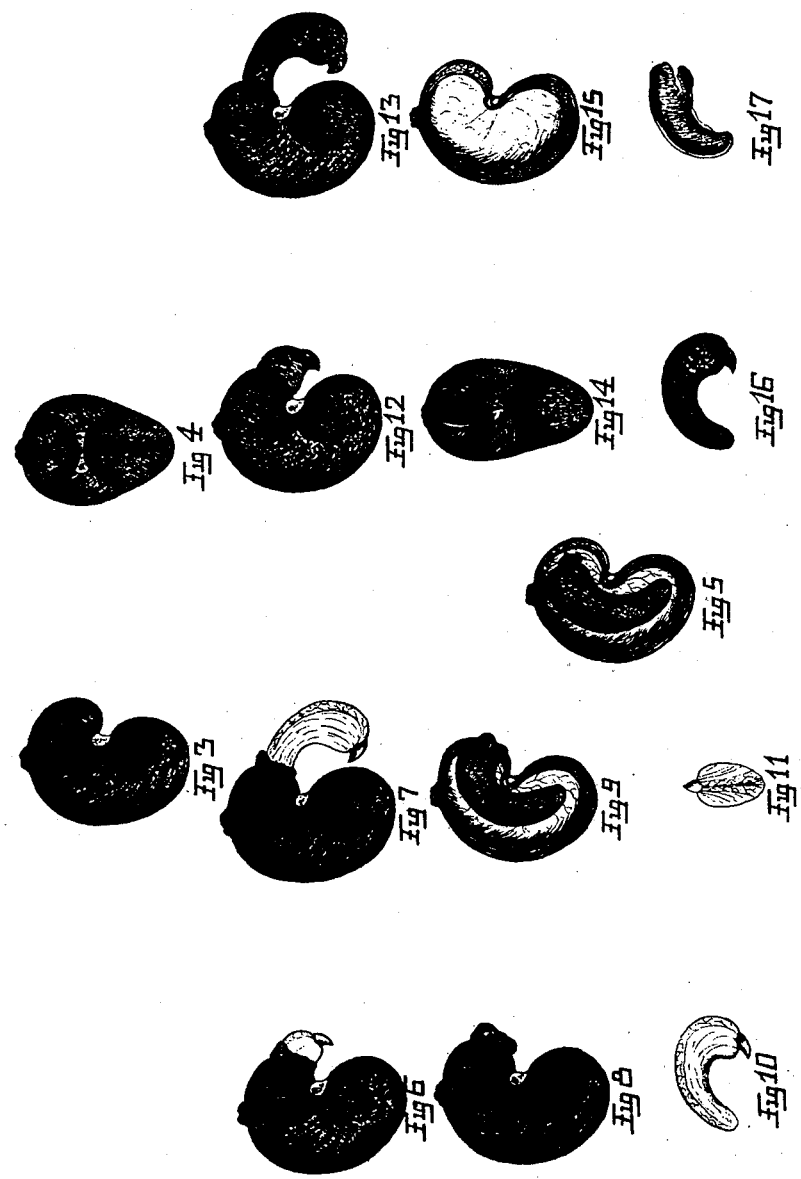

Sept. 17, 1957 P. VAN DIJK 2,806,501
PROCESS FOR SEPARATING KERNELS FROM HARD-SHELLED NUTS
Filed Nov. 17, 1953 4 Sheets-Sheet 3
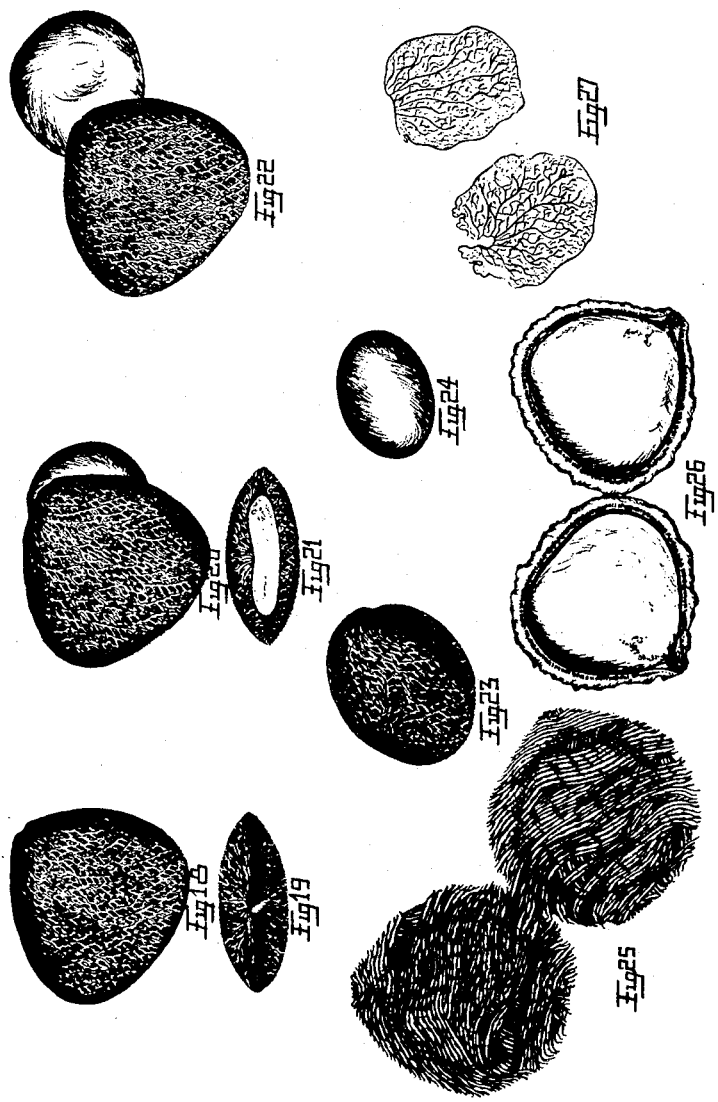
Inventor
PIETER VAN DIJK
By
Attorneys

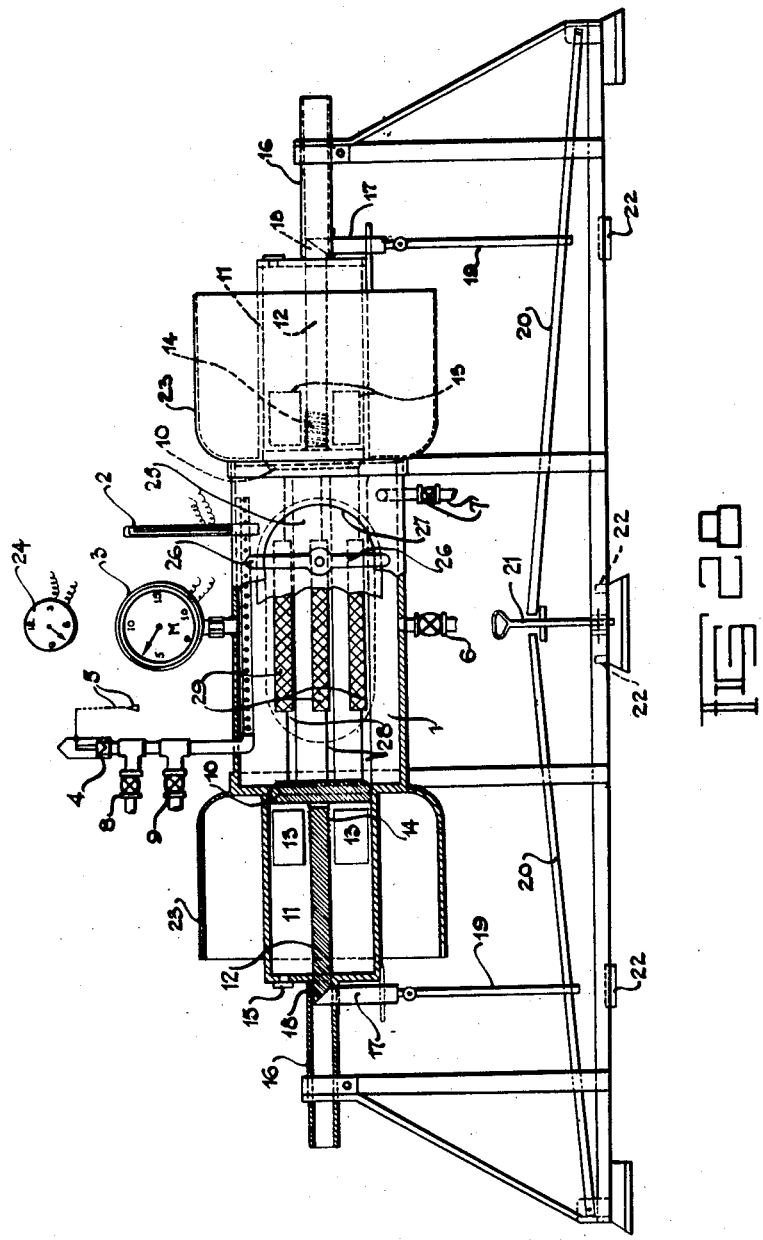

_United States Patent Office_ 2,806,501
Patented Sept. 17, 1957

2,806,501

PROCESS FOR SEPARATING KERNELS FROM HARD-SHELLED NUTS

Pieter van Dijk, Lourenco Marques, Portuguese East Africa, assignor to Investigacao E Exploracao Industrial (S. A. R. L.), Lourenco Marques, Portuguese East Africa Application November 17, 1953, Serial No. 392,674

Claims priority, application Union of South Africa September 8, 1950

13 Claims. (Cl. 146—223)

This invention relates to an improved process for the treatment of hard-shelled nuts for the separation of the kernels from the shells thereof and to apparatus for carrying out the process and is particularly applicable to that species of nut in which the shells contain phenol and/or resinous substances such as cashew nuts of the Anacardium group and Telfairia Pedata seeds.

This invention is an improvement in or development of the invention described in the specification of United States application Serial No. 245,202, now abandoned, of September 5, 1951, of which the present application is a continuation-in-part. Since the filing of the application for this prior patent, it has been discovered by extensive experiments that to obtain the best results, the times of treatment of the nuts or seeds, the temperatures to which they are subjected in the treating chamber and during the preliminary softening treatment must be held within relatively narrow limits. Accordingly the present invention gives details regarding these critical times and temperatures.

Objects of the invention are to effect separation of the kernels from the shells in such a manner that the kernels are obtained whole, uncontaminated and undamaged in a hygienic manner either with or without the epidermis, as desired and so that the phenol and/or resinous substances contained in the shells are not detrimentally affected as regards their chemical composition and commercial value.

It is well known that the shells of cashew nuts contain an oily substance hereinafter referred to as "the shell liquid" which is used in the manufacture of varnishes, lacquers, paints, insulating materials and for many other purposes. This shell liquid is poisonous and vesicant and care must therefore be taken to ensure that the very valuable kernels and any oils and residues therefrom are not contaminated by it and thereby rendered unfit for human and/or animal consumption.

The shells of Telfairia Pedata seeds contain a resinous substance which is useful in the manufacture of plastics and for other purposes.

It is also well known that cashew nut shells are extremely tough, and, for this reason, the opening of the shells and the separation of the shells from the kernels has always presented considerable difficulties.

Until this present process was put into operation the best known method of dealing with the decortication of cashew nuts was by the immersion of the cashew nuts in a bath of hot shell liquid. During the period of immersion a small percentage of shell liquid was obtained. After the removal of the cashew nuts from the bath of hot shell liquid the shells were allowed to dry and thereafter they became brittle and were then broken one by one, for which purpose a wooden mallet was used.

Although many machines have been devised for the breaking of cashew nut shells by mechanical means, so far no apparatus has yet been invented which has proved successful and the old method of breaking the cashew nut shells and removing the epidermis manually one by one was still in use until this present invention was put into operation. Due to the almost insuperable difficulties of decortication it was not possible to process Telfairia Pedata seeds on a commercial basis until the discovery of this present process.

Another object of this invention is to provide a process and simple apparatus whereby large quantities of cashew nuts are efficiently treated and the empty shells from which the kernels have been ejected retain unimpaired all their natural properties.

A further object of this invention is to enable Telfairia Pedata seeds to be efficiently treated by the same process and apparatus, whereby large quantities of kernels, uncontaminated and without epidermis attached, are produced, the kernels and shells retaining all their natural properties.

Another object of this invention is to produce kernels, oils and residues under hygienic conditions by eliminating any unnecessary manual labour.

It is known that the normal germination process of nuts of the kind referred to takes from two to three months. A careful study has been made of this germination process which takes place naturally and the process according to the present invention is one in which this normal germination process is artificially accelerated.

During this natural period of germination the biological-chemical catalytic reaction of the enzymes acting in conjunction with the properties of the kernels, plus humidity, produce gas ($CH_2$) and this gas causes the kernels to be ejected from the shells within this period. By the process according to the invention artificially produced internal pressures within the shells perform this process in a fraction of a second.

The short period required for the treatment of cashew nuts, Telfairia Pedata seeds and nuts and/or seeds of a similar character by this process, allows of no opportunity for the enzymes to react, fermentation does not take place, the kernels of the processed nuts and/or seeds therefore retain their full natural flavour and properties.

Processes for facilitating the removal of the kernels from Brazil nuts and cocoa beans, and similar nuts or seeds are known in which the nuts are subjected to steam and/or air or a suitable gas under pressure in a liquid and air-tight vessel whereby the steam or other medium penetrates the shells. Thereafter the pressure is released whereby the steam or the like which has penetrated the shell will burst or fracture the same. These known processes, however, are not applicable to the type of nuts concerned in connection with the present invention and such processes would not effect the ejection of the kernels in a whole and uncontaminated state which does in fact result from the present process. It has been found by extensive experiment that to obtain the desired result the pressure to which the nuts are subjected, the temperature to which they are raised during the pressure treatment and the time of release of the pressure, as also the total treatment period within a pressure chamber, had to be predetermined to comparatively close limits if the kernels were to be ejected in the manner required.

According to the invention, a process for effecting separation of the kernels from the shells of hard-shelled nuts or seeds of the kind referred to, consists in the steps of, immersing the nuts or seeds in water for a predetermined period to soften the shells, thereafter placing the nuts or seeds in a fluid-tight pressure chamber, increasing the gaseous pressure in the chamber to a predetermined value with or without the introduction of steam, while at the same time increasing the temperature within the chamber to a predetermined value, which is always less than that which would damage the natural phenol or resinous substances contained in the shells or cause such shells to "bleed," maintaining such elevated pressure and temperature for a predetermined length of time sufficient to bring the internal pressure within the shell of each nut or seed substantially up to the pressure within the chamber and then to cause instantaneous substantially explosive release of pressure from the chamber within a time period of a small fraction of a second, whereby the gaseous pressure within each nut causes the shell to split open along the natural cleavage line thereof and the kernel to be ejected undamaged through the slit opening thus made, in a manner simulating the natural germination process but effected by a vastly increased speed.

A most important requirement for carrying out the process is the instantaneous release of pressure in a small fraction of a second. This time should be not greater than $\frac{1}{200}$ of a second. The release should be so rapid that it constitutes in effect an explosive escape of the pressure fluid. Experiments have proved that when the release of pressure takes place in $\frac{1}{500}$ of a second when treating cashew nuts or Telfairia Pedata seeds, between 90% to 100% complete ejection of kernels from shells have been obtained.

Suitable maximum pressures in the chamber have been found to be from 37 lbs. to 60 lbs. per square inch (or 2.5 to 4.0 atmospheres) for cashew nuts and 52 lbs. to 75 lbs. per square inch (or 3.5 to 5.0 atmospheres) for Telfairia Pedata seeds, while the temperature should at no time exceed 124° C. (255° F.) otherwise, more particularly in the case of cashew nuts, bleeding of the shell liquid from the shells will take place.

The time of treatment of the nuts or seeds in the pressure chamber varies from 2½ to 4 minutes, depending upon the species variety and their maturity.

The gaseous pressure is preferably created by a mixture of air and steam admitted separately or simultaneously.

The essential features of the immersion or conditioning treatment is the subjection of the nuts or seeds to a period of soaking in water which has the effect of softening the shells and the epidermis of the kernels. The length of time during which this soaking treatment takes place determines whether the majority of the kernels will be ejected with or without the epidermis attached thereto. To effect ejection of the kernels without the epidermis attached, the soaking time must be extended up to approximately twice that necessary for causing ejection of the kernels with the epidermis attached. The nuts are preferably soaked in a hot-water bath and thereafter in a cold-water bath.

In the case of cashew-nuts, the preferred conditioning treatment is as follows:

The nuts are first subjected to soaking in a hot-water bath at a temperature of 90° C. (194° F.) for a period, depending on the maturity of the nuts, of from 20 to 55 minutes. The older or more mature the nuts the shorter the time period necessary to soften the shells to the required degree.

Thereafter, the nuts are removed from the hot-water bath and are then subjected to soaking in a cold-water bath at a normal room temperature (20° C. to 30° C.) (68° F. to 86° F.) for a period of from 15 to 20 minutes. The nuts are then immediately charged into the pressure chamber.

By adopting this conditioning treatment, the majority of the kernels are ejected with the epidermis attached.

When it is desired to cause ejection of the majority of the kernels without the epidermis attached thereto, the time of soaking in the hot-water bath is increased to from 40 minutes for the older nuts to 110 minutes for the fresh nuts, while the soaking time in the cold-water bath is increased to about 30 minutes or double the time necessary when the nuts are not required to be ejected free of the epidermis.

By subjecting the nuts to this last mentioned conditioning treatment, the kernels are ejected whole with embryo attached, in which condition they have a higher monetary value for human consumption than when the embryo is detached and consequently lost.

It is known that medical oils can be extracted from the kernels. In some cases, these oils may be more valuable than the kernels when required for human consumption as nuts. In this case, the longer hot- and cold-water bath treatments are employed in preference to the shorter treatments which result in ejection of the kernels with their epidermis attached.

The Telfairia Pedata seeds require a somewhat different conditioning treatment owing to their structure being quite different from that of the cashew nut. The shell of the Telfairia Pedata seed is encased by a close meshed tough fibrous basket-like covering. To facilitate ejection at least that portion of the fibrous covering along the natural cleavage line is scorched to weaken it.

The nuts are then soaked in a hot-water bath at a temperature of 95° C. (203° F.) for approximately 40 minutes if it is desired to obtain kernels without the epidermis attached and thereafter in a cold-water bath at room temperature (20° C. to 30° C.) (68° F. to 86° F.) for 15 to 20 minutes. They are then immediately charged into the pressure chamber.

The reason for the epidermis remaining inside the shell is explained as follows. During the period when the nuts and/or seeds are subjected to vaporous and/or gaseous pressure the external pressure penetrates the pores of the shells and epidermis until the internal pressure within the shells equals that of the external pressure surrounding the nuts and/or seeds. When the external pressure is instantly released the internal pressure fluid attempts to penetrate the pores of the epidermis and shells and as a result of the suction created the epidermis is drawn from the kernels towards the inner walls of the shells; whereby the internal pressure within the shell ejects the kernel from the epidermis and shell. The oily substances released from the kernels which adhere to the inner walls of the epidermis facilitating the process of ejection of whole, polished, undamaged kernels, without the epidermis.

Telfairia Pedata seeds require the different preliminary softening treatment due to their structure and peculiar shell covering; in order to shorten the preliminary treatment and actual processing the basket-like coverings of the shells are cut or scorched along the natural lines of opening prior to actual processing; if, however, it is desired to retain undamaged the basket-like shell coverings it is necessary for the preliminary treatment to be lengthened for approximately double the time above indicated.

Two examples of treatments in the pressure chamber are as follows:

*Cashew nuts*

After nuts have been subjected to one or other of the aforementioned softening or conditioning treatments previously described, they are charged into the pressure chamber which is at a temperature of 110° C. (230° F.). Steam is then admitted over a period of approximately 2 minutes to bring the pressure in the chamber up to 45 lbs. per square inch and the temperature up to approximately 120° C. (248° F.). Air only is then introduced for a further ½ minute until the pressure reaches approximately 60 lbs. per square inch (4 atmospheres). After a pause of about 2 minutes to allow the pressure inside each nut to attain the full pressure in the chamber, the pressure is instantaneously released in such a manner that the internal pressure in the chamber drops to substantially atmospheric pressure in the space of approximately $\frac{1}{500}$ of a second. The nuts are then removed when it will be found that substantially all the kernels will have been ejected from their shells in a whole and uncontaminated condiiton, with embryo attached or with epidermis according to the conditioning treatment employed.

Telfairia Pedata seeds

Here again, the seeds after the preliminary softening and conditioning treatment are charged into the pressure chamber which as before is at a temperature of 110° C. (230° F.). Air is then admitted for ½ a minute to bring the pressure in the chamber up to 30 lbs. per square inch (2 atmospheres). Thereafter steam is admitted to increase the pressure up to approximately 75 lbs. per square inch (5 atmospheres) and the temperature up to 120° to 122° C. (250° F.). After a pause of 2 minutes to allow equalisation of the pressure within each nut and the chamber to take place, the pressure is released instantaneously in the same manner as in the case of the cashew nuts. On removal of the nuts, it will be found that substantially all the kernels will have been ejected from their shells without damage or contamination and without the epidermis.

In order that the invention may be more clearly understood, reference is now made to the accompanying sheets of drawings in which like reference numerals refer to like parts throughout the several views.

In the drawings:

Figure 1 is an enlarged longitudinal cross-sectional view of an untreated cashew nut;

Figure 2 is an enlarged longitudinal cross-sectional view of an untreated Telfairia Pedata seed;

Figure 3 is a side view of a whole cashew nut before treatment (shown natural size);

Figure 4 is an edge view of the same nut with the concave edge facing the observer (shown natural size);

Figure 5 shows the nut as shown in Figure 3 but in cross-section clearly indicating the position of the kernel within the shell, complete with embryo attached and enclosed in the epidermis (shown natural size);

Figure 6 shows the initial opening of the shell along the natural cleavage line and the commencement of the emergence of the kernel leaving the epidermis within the shell (shown natural size);

Figure 7 shows the kernel almost completely ejected (shown natural size);

Figure 8 shows the shell after the kernel has been ejected and shows a small portion of the epidermis protruding from the slit-like aperture from which the kernel has been ejected (shown natural size);

Figure 9 is a cross-section of the shell shown in Figure 8 showing how the epidermis is retained within the shell after the ejection of the kernel (shown natural size);

Figure 10 and 11 show elevation and end views of the whole kernel after it has been ejected, complete with the embryo attached (shown natural size);

Figure 12 shows the commencement of the ejection of the kernel with the epidermis attached thereto (shown natural size);

Figure 13 shows a further stage in the ejection where the kernel with the epidermis attached is almost completely ejected from the shell (shown natural size);

Figure 14 shows the empty shell which clearly indicates the opening along the natural cleavage line through which the kernel has been ejected (shown natural size);

Figure 15 is a cross-section through the empty shell after ejection of the kernel (shown natural size);

Figure 16 shows the kernel after ejection with epidermis attached;

Figure 17 shows portion of the epidermis which, after ejection of the kernel and complete drying thereof, can be readily removed by a rubbing or brushing action;

Figures 18 and 19 show elevation and end views of a Telfairia Pedata seed (shown natural size);

Figure 20 shows the kernel at the commencement of its ejection from the shell (shown natural size);

Figure 21 is an end view taken on Figure 20;

Figure 22 is a view similar to Figure 20, but showing the whole kernel nearing the completion of its ejection from the shell through the opening along the natural line of cleavage of the shell;

Figure 23 shows the empty shell after the ejection of the kernel (shown natural size);

Figure 24 shows the whole kernel after ejection (shown natural size);

Figure 25 shows the close meshed fibrous covering of the seed after removal from the shell (shown natural size);

Figure 26 shows the shell of the Telfairia Pedata seed divided into two half sections and indicating the closely spaced resin bearing cells or combs around the edges (shown natural size);

Figure 27 shows the two halves of the epidermis which normally covers the kernel itself (shown natural size); and Figure 28 is a side view, partly in longitudinal vertical section, of an apparatus particularly adapted for carrying out the improved process of the present invention.

Referring to Figure 1 of the drawings, (a) denotes the shell and (k) the kernel which is encased by the epidermis (j). The shell (a) is composed of an outer casing (f) and an inner liner casing (e) while the space between said casings (f) and (e) is composed of combs or cells (g) containing the shell liquid in the form of an oil. At the natural cleavage region denoted by (b), which provides a fibrous non-cellular structure (c), no liquid combs or cells occur. The pistil is denoted by (h) and the germination point by (d) while the lacuna is denoted by reference (m). Reference (l) indicates the embryo, (i) the air or gas chamber and (j) the epidermis.

Referring to Figure 2 of the drawings, reference (o) is the shell, (p) is the natural cleavage region, (r) indicates the resin-bearing combs or cells, (s) the close-meshed fibrous covering of the shell, (t) the air or gas chamber, (w) the epidermis and (y) the kernel.

Referring to Figure 28 of the drawings, reference numeral 1 denotes a cylindrical pressure chamber with which is associated a thermometer 2, a manometer 3 and a safety valve 4. The safety valve 4 is provided with a manual pressure release device 5. In the bottom of the pressure chamber 1 a tap or cock 6, for drainage of water and fluids extracted from the shells, is provided as also a second tap or cock 7 acting as a steam or gas outlet control means. The tube mounting the safety valve 3 also carries an inlet valve 8 for compressed air and a second inlet valve 9 for the introduction of steam or other gases which may be heated and if desired may have a moisture content for varying the humidity within the pressure chamber.

For instantaneous pressure release, a specially designed device is provided on each end of the pressure cylinder 1, and consists essentially of piston-like valves 10. Each valve 10 is mounted on a piston rod 12 and is slidable within a cylinder 11 which in turn is provided adjacent its inner end with exhaust openings or ports 13. Over the rod 12 immediately behind the piston 10, a compression spring 14 is provided to act as a shock absorber. In the rear end of each cylinder 11 an adjustable opening 15 is provided to form an air shock absorber. Each rod 12 is slidably located within a horizontal tube 16, while a locking latch 17 extends into the tube 16 for coacting engagement with the free end 18 of each rod 12 for locking of the valves 10 in their closed positions with respect to their coacting seatings. The locking latches 17 are connected by latch bars 19 and 20 to hand release means 21, which on release, permits instantaneous and simultaneous withdrawal of the latches 17 assisted by the pressure on the valves 10 and consequent release of such valves 10. Buffers 22 are provided in the frame structure for receiving the impulses produced on the unlatching action of the latch bars 19 and 20.

Mounted concentrically and in spaced relationship to the cylinders 11 are safety screens or casings 23, which also act as silencers.

A time recorder with electrical connections 24 is also associated with the apparatus. The aforesaid thermometer and manometer 2 and 3 respectively are also electrically connected to warning and/or automatic control devices if desired.

In at least one side of the pressure cylinder 1 a manhole opening 27 is provided which in turn is closed by a closure member or door 25 which is secured in position by manhole cross bars 26 according to known practice. The door opening 27 is adapted to be sealed off by the door 25.

Within the pressure cylinder 1 tray supports 28 are provided on which wire mesh trays 29, in which the nuts or the like are introduced into the pressure chamber. The layers of nuts or seeds should not exceed a thickness of 5 centimeters. The trays 29 are provided with perforated lids to prevent the kernels and shells from flying about in the chamber 1 and dropping to the bottom when the pressure is instantaneously released.

The kernels without the epidermis may be subjected to forced hot air draught circulation and/or centrifugal force for the complete or desired percentage elimination of moisture, depending on the amount of roasting desired. The kernels are then ready for vacuum packing and transport while the shells can be stored until further extraction of the shell liquids is desired.

What I claim is:

1. An improved process for effecting separation of the kernels from the shells of hard-shelled nuts or seeds of the kind referred to which comprises the steps of immersing and soaking the nuts or seeds in water for a predetermined period to soften the shells, thereafter placing the nuts or seeds in a fluid-tight pressure chamber, increasing the gaseous pressure in the chamber to a predetermined value, whilst at the same time increasing the temperature within the chamber to a predetermined value always less than that which would damage the natural substances contained in the shells or cause such shells to bleed, maintaining such elevated pressure and temperature for a predetermined length of time sufficient to bring the internal pressure within the shell of each nut or seed substantially up to the pressure within the chamber, and then causing instantaneous substantially explosive release of pressure from the chamber within a time period not exceeding $1/500$ of a second, whereby the gaseous pressure within each nut or seed causes the shell to split open along the natural cleavage line thereof and the kernel to be ejected undamaged through the slit opening thus made in a manner simulating the natural germination process, but effected at a vastly increased speed.

2. A process as claimed in claim 1 wherein the maximum pressure within the chamber at the instant of release of pressure is from 37 to 60 lbs. per square inch while the temperature at no time exceeds 124° C.

3. An improved process as claimed in claim 1, wherein the period of treatment of the nuts in the pressure chamber is from 2½ to 4 minutes.

4. An improved process as claimed in claim 1, wherein the gaseous pressure in the chamber is created by a mixture of air and steam.

5. An improved process as claimed in claim 1, wherein the shell-softing soaking treatment of the nuts or seeds before they are introduced into the pressure chamber comprises the subjection of the nuts or seeds to soaking in water first at a temperature well above room temperature and thereafter at a temperature which is approximately at room temperature.

6. An improved process as claimed in claim 1, wherein in order to effect ejection of the kernels without the epidermis attached, the soaking treatment is extended up to approximately twice that necessary for causing ejection of the kernels with the epidermis attached.

7. An improved process as claimed in claim 1, for the separation of the kernels from the shells of cashew nuts, in which the shell-softening soaking treatment includes the steps of first soaking the cashew nuts in a hot water bath at a temperature of about 90° C. for a period of from 20 to 55 minutes depending upon the maturity of the nuts, and thereafter soaking the previously soaked cashew nuts in a water bath at normal room temperature for a period of from 15 to 20 minutes.

8. An improved process as claimed in claim 1, for the separation of the kernels from the shells of Telfairia Pedata seeds, in which the shell-softening soaking treatment includes the steps of first soaking the Telfairia Pedata seeds in a hot water bath at a temperature of 95° C. for approximately 40 minutes when it is desired to obtain the kernels without the epidermis attached, and thereafter soaking the previously soaked Telfairia Pedata seeds in a water bath at a room temperature of from 20 to 30° C. for a period of from 15 to 20 minutes.

9. An improved process as claimed in claim 1, for the separation of the kernels from the shells of cashew nuts, in which the pressure chamber is at a temperature of about 110° C. when the cashew nuts are placed therein, thereafter introducing steam into the pressure chamber over a period of about two minutes to bring the pressure in the chamber up to about 45 lbs. per square inch and to a temperature up to about 120° C., then introducing air into the pressure chamber for a further period of about one-half minute to bring the pressure in the chamber up to approximately 60 lbs. per square inch, and effecting the release of pressure from the pressure chamber after a pause of about 2 minutes, which release of pressure is effected in a period of time approximating $1/500$ of a second.

10. An improved process as claimed in claim 1, for the separation of the kernels from the shells of Telfairia Pedata seeds, in which the pressure chamber is at a temperature of about 110° C. when the Telfairia Pedata seeds are placed therein, thereafter introducing air into the pressure chamber for a period of about one-half minute to bring the pressure in the chamber up to about 30 lbs. per square inch, then introducing steam into the pressure chamber in sufficient amount to increase the pressure up to approximately 75 lbs. per square inch and to raise the temperature up to about 120° C., and effecting the release of pressure from the pressure chamber after a pause of about two minutes, which release of pressure is effected in a period of time approximating $1/500$ of a second.

11. An improved process as claimed in claim 1 for the separation of the kernels from the shells of Telfairia Pedata seeds, including the steps of scorching the seeds along their regions of natural cleavage to weaken the fibrous covering of the Telfairia Pedata seeds, and thereafter soaking the resulting scorched seeds in water first at a temperature well above room temperature and thereafter at a temperature which approximates room temperature prior to placing the Telfairia Pedata seeds in the pressure chamber.

12. An improved process as claimed in claim 1, including the steps of treating the hard-shelled nuts or seeds in the pressure chamber for a period of from 2½ to 4 minutes, heating the seeds or nuts in the pressure chamber to a temperature approximating but at no time exceeding 124° C., and controlling the pressure in the pressure chamber to a predetermined maximum pressure of from 37 to 60 lbs. per square inch at the instant of the release of pressure from the pressure chamber.

13. An improved process as claimed in claim 1, including the steps of introducing air and steam into the pressure chamber to create a gaseous pressure therein, heating the hard-shelled nuts or seeds in the pressure chamber to a temperature approximating but not exceeding 124° C., and controlling the pressure in the pressure chamber to provide a maximum pressure therein not exceeding from 37 to 60 lbs. per square inch at the instant of the release of pressure from the chamber.

(References on following page)

References Cited in the file of this patent

UNITED STATES PATENTS

| | | |
|---|---|---|
| 1,433,928 | Baxter | Oct. 21, 1922 |
| 1,985,235 | Bizzell | Dec. 25, 1934 |
| 2,248,327 | Bainer et al. | July 8, 1941 |
| 2,248,365 | Leonard et al. | July 8, 1941 |
| 2,248,367 | Low | July 8, 1941 |
| 2,248,368 | Low | July 8, 1941 |
| 2,278,941 | Musher | Apr. 7, 1942 |
| 2,516,299 | Chiego | July 25, 1950 |

FOREIGN PATENTS

| | | |
|---|---|---|
| 253,241 | Great Britain | June 17, 1926 |